United States Patent [19]

Curry

[11] Patent Number: 5,696,604
[45] Date of Patent: Dec. 9, 1997

[54] ANALYTICAL HALFTONE DOT CONSTRUCTION FOR A HYPERACUITY PRINTER

[75] Inventor: Douglas N. Curry, Menlo Park, Calif.

[73] Assignee: Xerox Corporation, Stamford, Conn.

[21] Appl. No.: 368,459

[22] Filed: Jan. 4, 1995

[51] Int. Cl.$^6$ ................................................ H04N 1/405
[52] U.S. Cl. ..................... 358/459; 358/298; 358/456; 358/525; 347/131
[58] Field of Search .................... 347/131; 358/519, 358/521, 525, 406, 504, 298, 456, 458, 459, 534, 535

[56] References Cited

U.S. PATENT DOCUMENTS

| | | | |
|---|---|---|---|
| 4,651,287 | 3/1987 | Tsao | 358/283 |
| 5,253,084 | 10/1993 | Rylander | 358/456 |
| 5,287,209 | 2/1994 | Hiratsuka et al. | 358/459 |
| 5,406,390 | 4/1995 | Mizoguchi | 358/456 |
| 5,414,531 | 5/1995 | Amemiya et al. | 358/465 |
| 5,566,372 | 10/1996 | Ikeda et al. | 358/458 |
| 5,583,660 | 12/1996 | Rylander | 358/456 |

*Primary Examiner*—Peter S. Wong
*Assistant Examiner*—Derek J. Jardieu
*Attorney, Agent, or Firm*—Fay, Sharpe, Beall, Fagan, Minnich & McKee

[57] ABSTRACT

A printing device (10) is commanded to print a reference set of intensity values from almost white or highlight regions through almost dark or shadow regions. A measuring device (12) measures the actual outputted printer intensity levels from the printing device (10). An interpolator (14) interpolates the printer intensity levels into a best fit smooth curve plotted against the reference set of intensity levels which produces a non-linear function. A mapping means and converter (24a, 24b) calculate a set of fractional intensity values and densities which produce a linear function when mapped with the printer intensity levels. A dot area parameter calculator (28) calculates a set of dot parameters defining a configuration of a halftone dot required to fill an area within the halftone cell corresponding to each intensity level. For each position of each halftone cell, a measurement processor (30) determines a distance between a current scan position (a,b) and a nearest edge defined by the dot parameters. A gray value calculator (50) calculates a gray value for the current scan position based on the distance and angle to the nearest edge of the dot. The halftone dot is completed when a gray value is calculated for each position within the halftone cell. The gray values are stored in a look-up table (26). When a new image is to be printed, the intensity values are input (54) and the scan position is indexed (52) through all available scan positions to generate corresponding addresses in the look-up table (26), causing the corresponding gray values to be output serially in order for use by a laser diode controller (56) of a laser printer or analogous controllers in other types of printers.

15 Claims, 6 Drawing Sheets

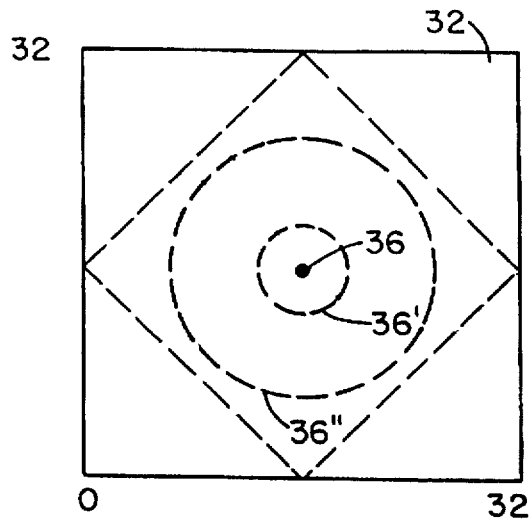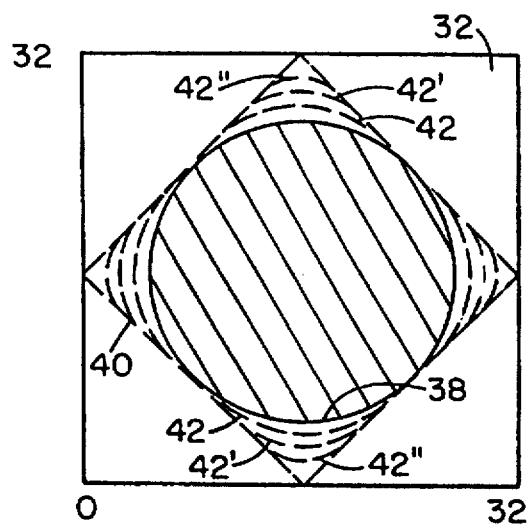
FIG.5A  FIG.5B
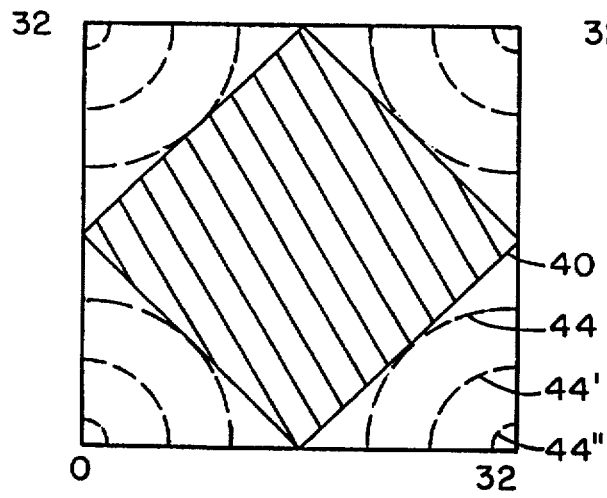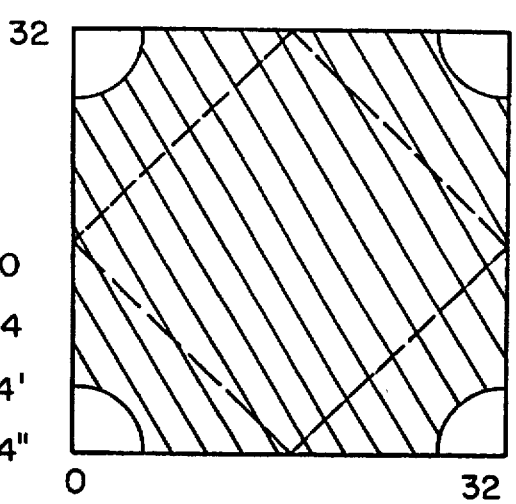
FIG.5C  FIG.5D

ANALYTICAL HALFTONE DOT CONSTRUCTION FOR A HYPERACUITY PRINTER

BACKGROUND OF THE INVENTION

The present invention relates to the halftoning arts. It finds particular application in conjunction with printing devices having halftone patterns for simulating gray value intensities and will be described with particular reference thereto.

Conventionally, printers do not produce true gray values. Rather, they only produce dots of black ink. In order to create a variety of gray tints, bunches of dots are outputted at various frequencies. The lower the number of black dots per unit area, the lighter the gray tone. The larger the number of black dots per unit area, the darker the resulting gray tone. The frequency controls the graininess of the gray tone area. There is a tradeoff between the number of gray tone levels available in human vision space. A halftone cell is a predetermined number of dots used to simulate a level of gray. Dots are arranged in a particular manner within the halftone cell to define a desired halftone spot shape (e.g., circle, square, triangle, etc.) or the dots are randomly scattered. Within each halftone cell, different gray level intensities are produced by changing the size of the halftone spot. A complete halftone pattern is formed from a multiplicity of halftone cells ranging from a cell with no dots on representing white to a halftone cell with all dots on representing black. Between the white and black cell, there is a variety of halftone spot sizes creating the different levels of gray. When the halftone cells are outputted by a printer, the human eye integrates the black dots and perceives gray areas, instead of the individual black dots.

The quality of images produced by a printer will depend on the proper arrangement of dots within each halftone cell of the halftone pattern. To this end, many printing devices use customized halftone patterns. A customized halftone pattern improves the quality of a printer's images since the printer does not produce a linearly distributed range of intensities without the use of the halftone pattern. By considering the printer's hardware capabilities and limitations for producing image intensities, a skilled halftone artist typically creates the halftone pattern by hand. Viewing the printer characteristics on a computer terminal, the artist turns on each bit of each halftone cell to create halftone shapes which visually appears to give the fewest artifacts for the specific printer. This process is laborious and time-consuming. It is also prone to human errors based on the subjective nature of creating each halftone cell.

Typically, each halftone cell is broken down into a fine grid, e.g., a 32×32 grid of scan positions which can be black or white. By turning appropriate scan positions on and off, a dot of the preselected size and shape, e.g., circle, square, triangle, etc. is defined. In a laser printer, the scanning laser is turned on and off to determine whether each scan position is black or white. In an ink jet printer, an ink drop is ejected or not to determine whether each position is black or white.

One problem with prior art printing devices is that the pigment or gray scale intensity within each scan position varies from device to device. While manual adjustment and calibration help standardize the images from various printing devices, such manual adjustment is still time-consuming and still leaves variations.

In accordance with the present invention, an analytical halftone dot construction system is provided which creates highly accurate halftone patterns automatically.

SUMMARY OF THE INVENTION

In accordance with one aspect of the present invention, a method and apparatus for constructing halftone dot patterns for a printing device is provided. A measuring device measures printer intensity levels of a printing device which are output in response to selected gray scale printer commands. A spline or other interpolator interpolates the actually measured intensity levels into a best fit smooth curve which are output in response to selected gray scale printer commands. A mapping means generates a series of halftone intensity values which correspond linearly to the smooth curve. A dot area parameter calculator calculates parameters of a halftone dot pattern for each halftone cell of the set of halftone intensity values. A gray value calculator determines a value for each position in each of the halftone cells based on the parameters calculated. A look-up table stores the values. The values from the look-up table are provided to the printing device to control intensity levels during a subsequent printing operation.

In accordance with a more limited aspect of the present invention, a position scanner scans through a plurality of scan positions within each halftone cell along a scan angle direction.

In accordance with a more limited aspect of the present invention, at each scan position of the halftone cell, a measurement processor calculates an edge distance to the nearest edge of the halftone dot of the printing intensity level in a scan angle direction. The measurement processor further calculates an edge angle from the scan angle to the nearest edge. The gray value for the scan position is produced by combining at least the edge distance value and the edge angle value. The gray value is stored in a look-up table at an address location which is a combination of the x,y-coordinate and the halftone intensity level of the halftone cell.

In accordance with another aspect of the present invention, a halftone dot pattern printing system is provided. An image input device inputs a series of intensity levels. A screen counter provides a series of scan positions within a halftone cell for each input intensity level. Each scan position and the intensity level of the corresponding halftone cell form a look-up table address. A look-up table is addressed by the look-up table address to retrieve a corresponding gray value. A printer device is controlled in accordance with the series of retrieved gray values to cause corresponding spots to be printed.

In accordance with a more limited aspect of the present invention, the panting system further provides software and hardware for loading the look-up table uniquely for each printing device. Each halftone cell of a predetermined halftone pattern has a characteristic intensity level. A position scanner indexes a scan position through the corresponding halftone cell. A measurement processor measures a dot pattern intensity characteristic for each index scanned position. A gray value calculator calculates a gray value in accordance with the dot pattern intensity characteristic for each scan position of each of the halftone cells. The gray values are loaded into the look-up table at an address corresponding to the scan position and the intensity level of the halftone cell. In this manner, the look-up table is preprogrammed to define the halftone cells uniquely for each printing device.

In accordance with another aspect of the present invention, a method of halftone dot pattern printing is provided. A family of halftone dot patterns are stored. A selected portion of the family of halftone patterns are printed with a selected printing device and the intensity level of each printed dot pattern is determined. Each dot pattern or cell is divided into a preselected array of scan positions. For each scan position, a corresponding value is determined and loaded into a look-up table. In subsequent printing operations, the look-up table is addressed by the intensity level of the corresponding dot pattern and corresponding scan positions within each dot pattern to retrieve the appropriate values which are conveyed to and control the printer.

One advantage of the present invention is that it customizes the dot pattern of the halftone cells to each printing device.

Another advantage of the present invention is that it corrects for non-linear intensity level distribution.

Another advantage of the present invention resides in its automatic and discontinuity-free transition between dot printers.

Another advantage of the present invention resides in the high fidelity of the generated dots.

Another advantage is that the dot patterns can be generated semi-automatically with scan angle and frequency being used as parameters.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIGS. 5A–5D illustrate how a dot grows from a circle into a diamond into a black region with circular white voids in a preferred circle-diamond-circle embodiment; and, FIG. 6 illustrates intensity variations for a variety of halftoning patterns.

DETAILED DESCRIPTION OF THE PREFERRED EMBODIMENTS

Figure 1:
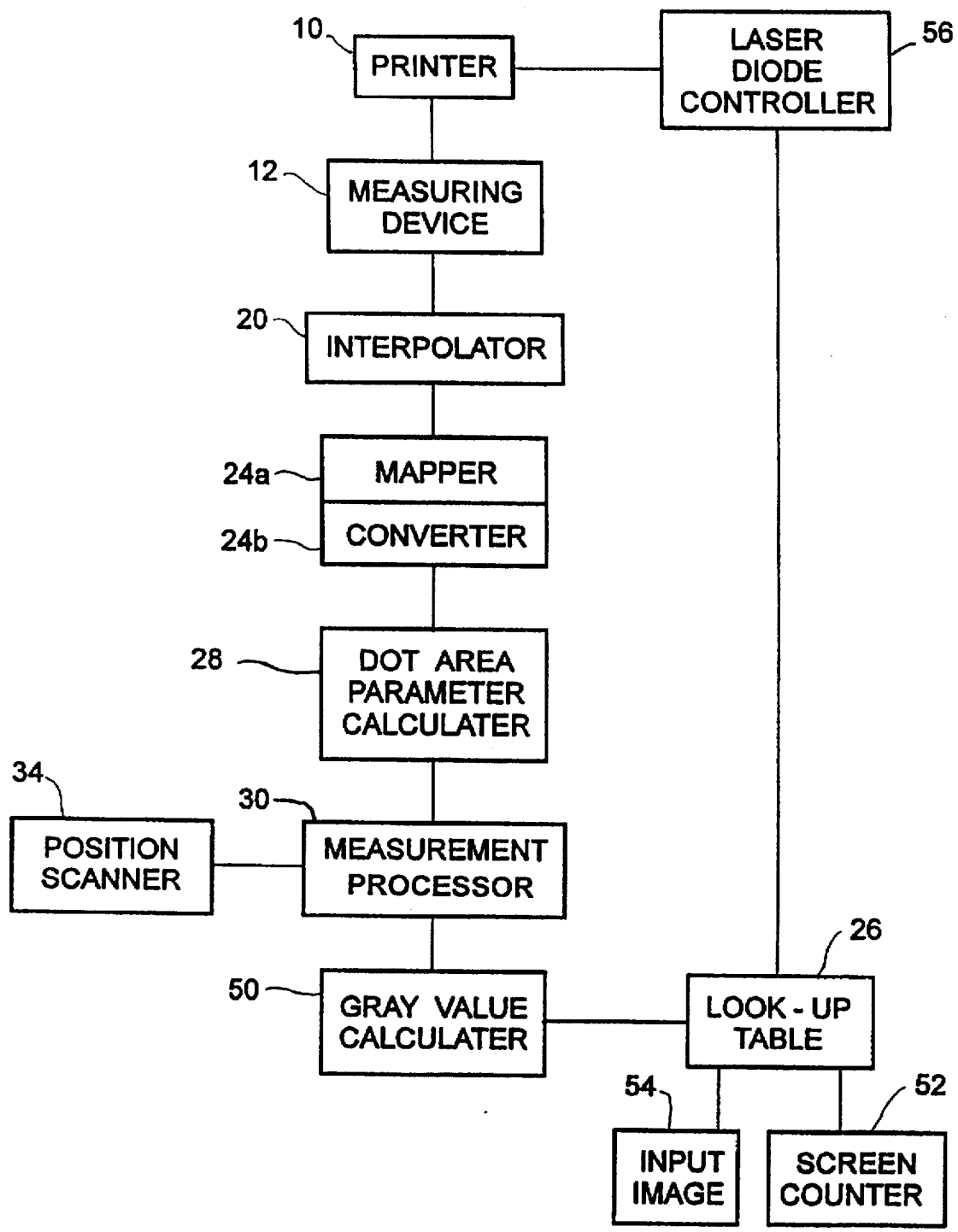
FIG. 1 is a diagrammatic illustration of a halftoning apparatus in accordance with the present invention.
Figure 2A:
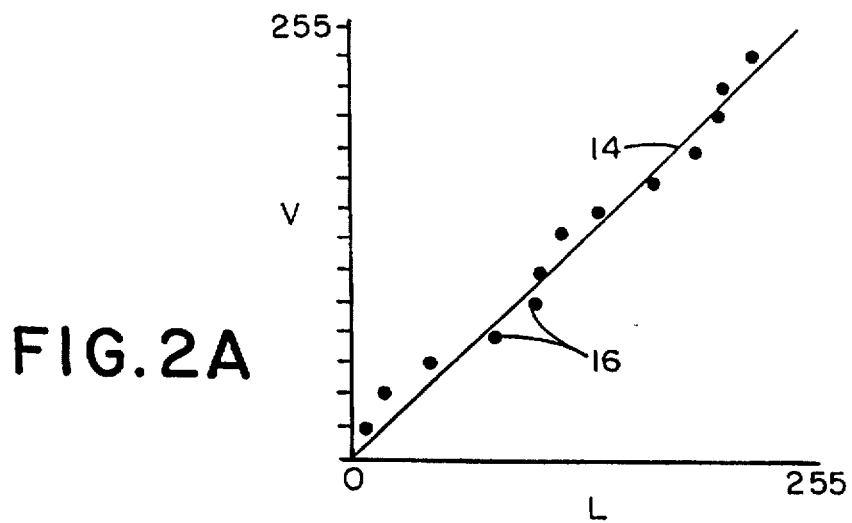
FIG. 2A is a plot of the measured intensity values superimposed on a linear or ideal relationship between input and output gray scales.

With reference to FIGS. 1 and 2A, a hard copy output device, such as a printer 10, responds to input intensity or gray scale commands to produce a corresponding hardcopy dot. Although laser and inkjer printers are preferred, other halftone printers and devices such as computer generated engraving plate devices, electrostatic printers, and the like are also contemplated. Typically, the printer has a preselected range of gray scale commands, e.g., 0 to 255.

Initially, the printer is given a series of input intensity commands corresponding to reference intensity values v, e.g., v=0, v=13, v=26, ..., v=255 to produce a corresponding set of hardcopy dots or gray scale samples. An intensity measuring device 12, preferably a microdensitometer, measures each of the gray scale samples to determine its actual intensity L. If L equals v, for all v and L, an ideal or linear relationship 14 would be achieved. However, due to printer characteristics, hardware and software designs, manufacturing tolerances, when the actually measured values of L are plotted against v, the resultant points 16 fall off the linear curve 14.

Figure 2B:
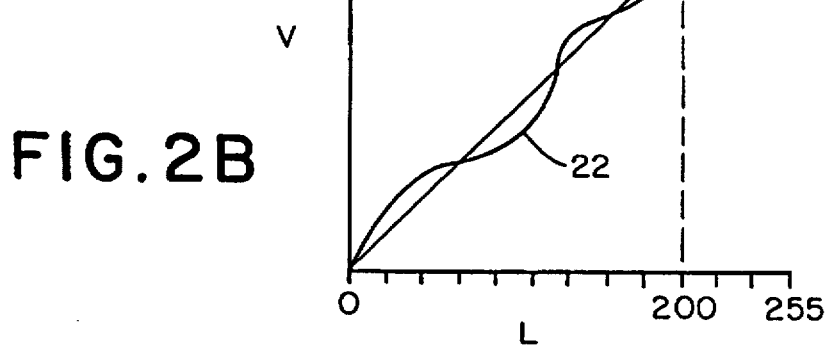
FIG. 2B is a plot of a continuous curve through the actually measured values of FIG. 2A.

An interpolator 20, preferably a cubic spline interpolator, provides a best fit smooth curve 22 through the points 16. A mapping algorithm or means 24a uses curve 22 to determine a v value corresponding to each of a preselected set of the L values, preferably the integer values of L from 0 to 255. As illustrated in FIG. 2B, for a typical integer value of L, the mapping algorithm projects up to the curve 22 and over to the v axis. Typically, the integer values of L produce corresponding fractional values of v. In the illustrated example, L=200 produces a corresponding v=199.15. For each of the new intensity values v, which are now typically fractional values, an intensity to density converter 24b determines a corresponding density value based on the linear mapping of FIG. 2C. The density value for an intensity value v represents an area of the halftone cell required to be filled by a halftone dot creating the intensity value v. The new density values are loaded into a look-up table 26.

Figure 2C:
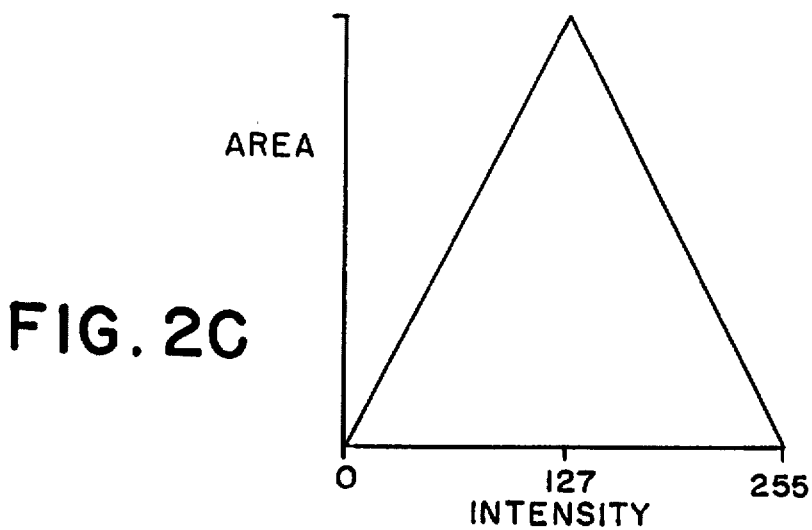
FIG. 2C is a plot of area to intensity of a halftone dot of a circle-diamond-circle halftone pattern.
Figure 3:
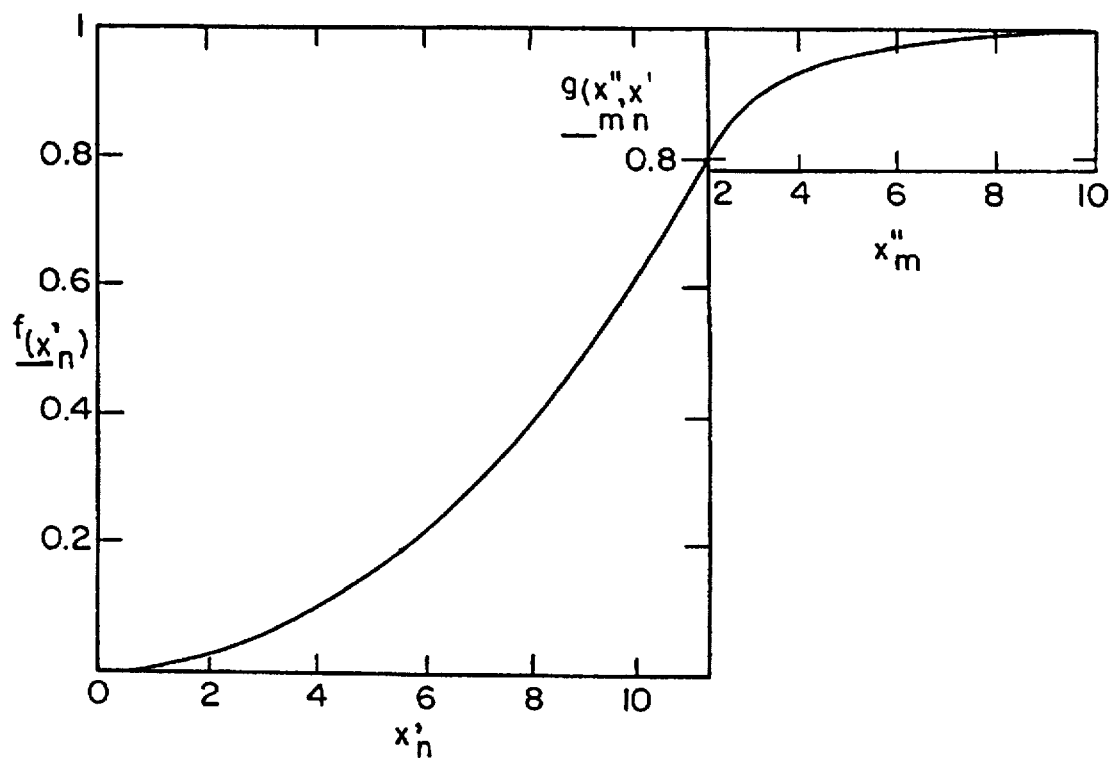
FIG. 3 illustrates a tone reproduction curve in accordance with the circle-diamond-circle halftone pattern.

In a second pass, the look-up table is addressed in equal steps L to retrieve the corresponding fractional v. For each v, there is a corresponding memory plane. That is, in halftoning, each halftone cell is divided into a grid of 1's and 0's or ink on and off spots. In the preferred embodiment, the grid is a 32×32 grid. Each grid or memory plane is addressed by a 5-bit x-value along one axis and a 5-bit y-value along the other axis. In the second pass, the 5-bit x and y-values for each of the fractional v memory planes are generated efficiently in equation space. In a circle-diamond tone reproduction curve of FIG. 3, the vertical axis represents the density values $f(x'_n)$ and the horizontal axis represents the corresponding radius $x'_n$ of a circular halftone dot required to produce the corresponding density. $x''_m$ represents a power value used to transform the circle halftone dot into a diamond halftone dot in the highest density range from 0.8 to 1.0 (80% to 100% of cell is filled in). It is to be appreciated that other halftone patterns may be used which would require a different tone reproduction curve based on the shape of the halftone dot. For the preferred circle-diamond-circle pattern, a mapping of intensity level to area of the black halftone dot circle corresponding to the intensity level increases linearly from 0 to 127, and the area of the white dot decreases linearly from 127 to 255 as shown in FIG. 2C. For the circle-diamond-circle pattern, the circle inverses in the high intensity range, i.e., all but white circles are blackened in the high intensity range.

With further reference to FIG. 1, dot area parameter calculator 28 calculates parameters for each halftone dot of each intensity level v based on the tone reproduction curve. For circle-diamond-circle halftone dot pattern, the dot parameters calculated are radius r and power p. Power p controls the transformation of the circle to the diamond shape. Alternately, for a different halftone dot pattern, the dot area parameter calculator 28 would calculate a different set of dot parameters based on the selected configuration of the halftone dot. The dot parameters for each halftone cell are inputted to a measurement processor 30.

Figure 4A:
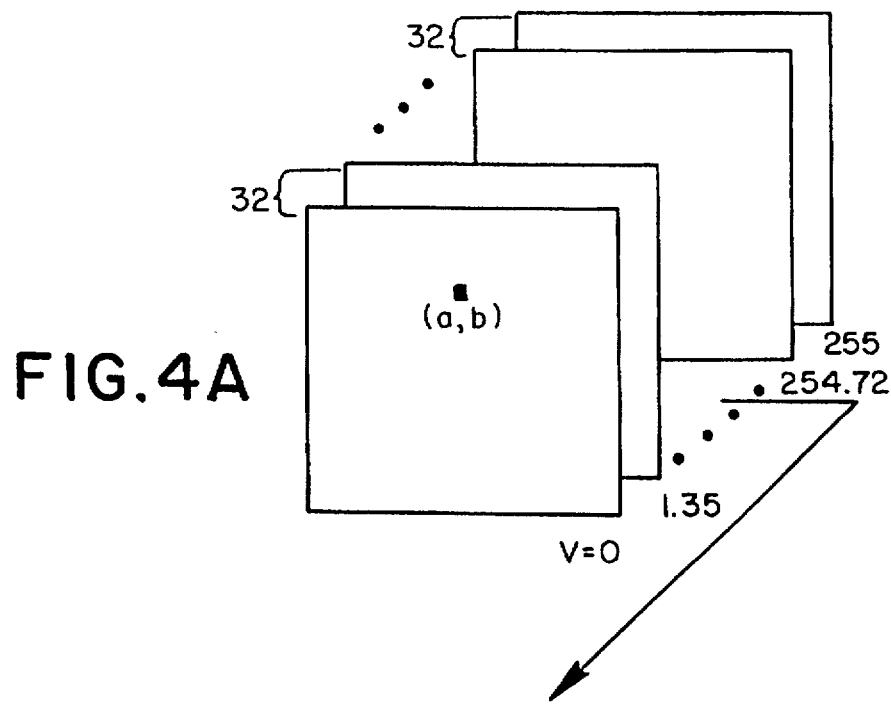
FIG. 4A is a diagrammatic illustration of a series of halftone cells used to determine gray values.

With reference to FIG. 4A, the 8-bit value v represents the selected halftone intensity range which, in the preferred embodiment, has 256 values from 0 to 255, some of which may be fractional values after being adjusted by the spline tone adjuster. Each of 256 halftone cells 32 represents one plane or intensity of the intensity range. A 5-bit x-address and a 5-bit y-address define a 32×32 halftone cell. Analogously, a 6-bit x-address and y-address would define a 64×64 halftone cell.

Figure 4B:
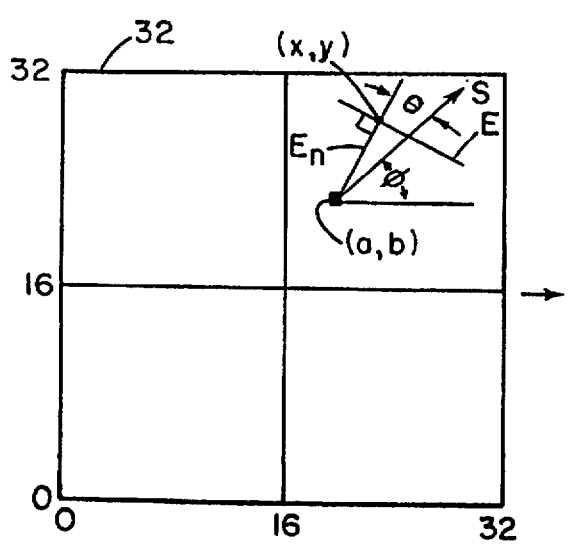
FIG. 4B is an illustration of determining a gray value of a scan position within the halftone cell.

With reference to FIGS. 1 and 4B, to construct a halftone dot for each halftone cell 32, a position scanner 34 traverses each x,y-coordinate or scan position in a scan direction S in the halftone cell. The measurement processor 30 locates a nearest edge E of the halftone dot for the current intensity v defined by the dot parameters of the circular, square, triangular, or other selected shape dot to a current scan position (a,b). Halftones are printed at a variety of screen angles φ, e.g., φ=45°, where the screen angle is the angle between the scan direction S and the x-coordinate direction. The nearest edge of interest E to the current scan position (a,b) is located in the screen angle direction. The nearest edge is defined by an edge normal $E_n$ which intersects the current scan position (a,b) and a point (x,y) on the edge or surface of the dot, for the given intensity value v.

Figure 6:
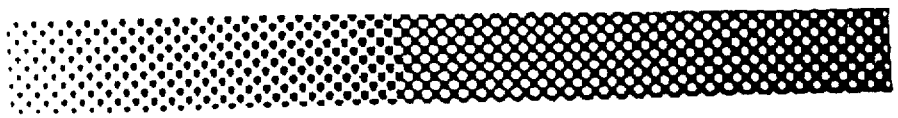
Figure 6:
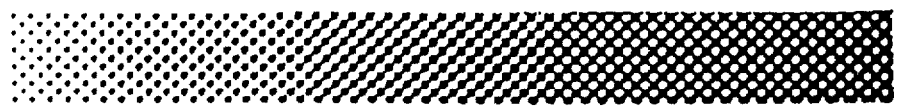
Figure 6:
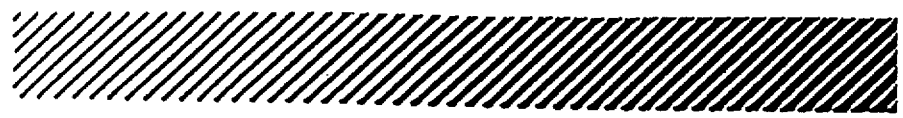
Figure 6:
Figure 6:
Figure 6:

With reference to FIGS. 5A–5D, the halftone cell is created on the basis of a predetermined halftone dot pattern. In the exemplary embodiment, the halftone dot pattern has a circular dot 36 in highlight regions (FIG. 5A). As the regions become darker, larger numbers of the 32×32 scan positions are turned on to define circular dots of larger diameters, such as circular dots 36' and 36". With reference to FIG. 5B, the circular dots continue getting larger to a mid-range in which the circular dot 38 is tangent to a square or diamond 40 that fills half of the region of the halftone cell 32. Thereafter, as the dot becomes larger, it becomes a diamond or square with progressively less rounded corners 42, 42', 42" constrained within the diamond 40. With reference to FIG. 5C, the halftone cell is half black when the diamond 40 is completely filled. Thereafter, the black region fills out along patterns 44, 44', 44", progressively. The shape of the expansion is such that where four cells come together, a white circle is defined, when all four halftone cells have the same intensity (FIG. 5D). With reference to FIG. 6, dots of various other shapes may be selected. FIG. 6 illustrates for each of the dot shapes or patterns, halftone cells with a minimal frequency or intensity on the left and a maximal intensity or frequency on the right. Typically, the family of 256 cells, in the preferred embodiment, spans the range illustrated in FIG. 6 and further.

With reference to FIG. 4B, for the circle-diamond-circle halftone pattern of FIGS. 5A–5D, the measurement processor 30 calculates the x,y-coordinates of the nearest edge by:

$$g(x) = \left[ \; x \cdot (r^p - x^p)^{(\frac{-1}{p})} \cdot x^{(-p)} \cdot r^p - \right.$$
$$\left. x \cdot (r^p - x^p)^{(\frac{-1}{p})} + \frac{1}{(x-a)} \cdot b \right] \cdot (x-a) - (r^p - x^p)^{\frac{1}{p}}. \quad (1)$$

In this manner, g(x) evaluates to the difference in slopes of the normal to the edge E at (x,y), and a line through both (x,y) and (a,b). The root of the g(x) function gives the x-coordinate for the nearest edge E of the halftone dot. In Equation (1):

x represents the x-coordinate of edge E;

(a,b) represents the x,y-coordinate of the scan position;

r represents the radius of the halftone circle for the current intensity level v; and, p is a power value, that controls a transition rate among the circle, diamond, and circle dot patterns.

The y-coordinate of the nearest edge E is determined by:

$$y = (r^p - x^p)^{1/p} \quad (2)$$

Figure 4C:
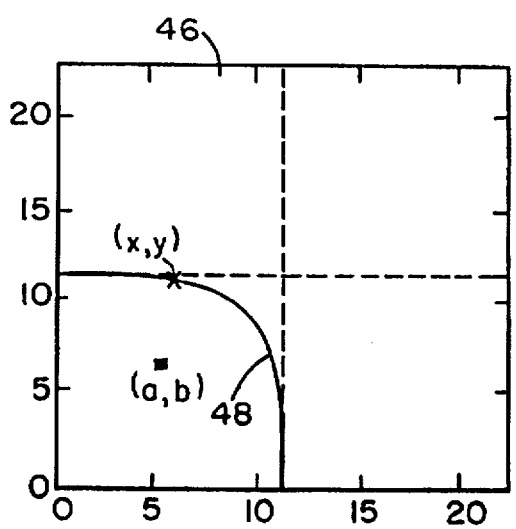
FIG. 4C is an illustration of determining the gray value in equation space.

With further reference to FIG. 4B, for a given intensity level v, (e.g., v=120), the nearest edge E to the scan position (a,b) is located based on the predetermined circle-diamond-circle halftone pattern at the given intensity level v=120 and the size and shape of the corresponding halftone dot defined by the dot parameters. The intensity level v=120 being just under half of the 256 possible levels of the preferred embodiment, one can expect a dot shape generally as shown in FIG. 5B by dot 42". Having determined the x and y-coordinate of the nearest edge from Equation (1), the measurement processor 30 calculates a Euclidean distance from the scan position (a,b) along the edge normal $E_n$ to the (x,y) on the edge. An angle Φ by which the edge normal $E_n$ is offset from the screen angle φ is also determined with the scan position (a,b) being the vertex. With reference to FIG. 4C, alternately, the position of the nearest edge E is located by mapping the (x,y) coordinate system of the halftone cell 32 into equation space. A corresponding equation space map 46 shows the relative positions of the scan position and edge E mapped into equation space. A line 48 represents an edge in equation space of the halftone dot shape for the v=120 intensity level. In particular, line 48 corresponds to one corner of the circle dot as it expands into the diamond shape of the mid-range intensity levels (FIG. 5B).

With reference to FIG. 1, the edge distance and edge angle Φ are inputted to a gray value calculator 50. A gray value for the intensity level v at scan position (a,b) is calculated as a function of the edge angle and edge distance in equation space. For example, the gray value is determined by:

$$\text{gray} = \left( 2 - \frac{\text{dist}}{\text{fastInc}} \right) \cdot \cos^2\theta + \left( \frac{\text{dist}}{\text{slowInc}} + .5 \right) \cdot \sin^2\theta, \quad (3)$$

where:

dist represents the Euclidean distance of the edge intersection point (x,y) from the scan position (a,b) in equation space; and fastInc and slowInc represent fast scan direction and slow scan direction components of a scaling factor which relates the distance measured in scans or spot size to the size of a memory location.

Alternately, the gray value can be determined by:

$$\text{gray} = \left( \frac{\left(\frac{\text{dist}}{\text{Inc}}\right) + (\text{fastbias} \cdot \cos\theta)}{\sin\theta} \right) + 0.5, \quad (4)$$

where:

fastbias is a position (left-right) bias which controls where the black-white transition occurs in the fast scan direction; and Inc is a scaling factor measured in scans or spot size which relates the distance to the size of a memory location.

It is to be appreciated that other gray functions are contemplated in accordance with advantages desired by those of ordinary skill in the art.

The position scanner 34 cycles through all possible permutations of the 5-bit x-coordinate of each halftone cell, the 5-bit y-coordinate, and the 8-bit intensity value, i.e., 32×32× 256 or $2^{18}$ permutations. A gray value, typically 0 through 15, is produced for each permutation. A look-up table 26 stores the determined gray values. In the preferred embodiment, the look-up table has $2^{18}$ memory locations. Each memory location is accessed by an address which is a combination of the 5-bit x-coordinate of a halftone cell, the 5-bit y-coordinate of the halftone cell, and the 8-bit intensity value v for the halftone cell, together providing an 18-bit address. The completed look-up table contains the gray values for each halftone cells for the selected intensity range. Alternately, the entire dot construction process may be repeated to generate more accurate halftone dots.

In real time, a screen generator counter 52 inputs a series of x,y-coordinates to define the positions within each halftone cell as an input image 54 provides a corresponding series of intensity levels v. The look-up table 26 is connected with the screen generator counters 52 and the intensity lines of the input image data 54. The screen counters 52 count for the x and y-coordinates along a predetermined screen angle, for example 45°. Thus, the counters count at the sine and cosine of 45° through the halftone look-up table 26. A corresponding gray value from a location corresponding to the combined values of (x,y,v) is outputted from the look-up table 26 to a laser diode controller 56 of printer 10 for printing the particular intensities and screen positions, i.e., printing the spots which, taken together over the whole cell, form the dot of proper size and shape. The gray value, again typically 0–15, can be fed to a digital-to-analog converter directly or can be converted to a code to drive a pulse width and position modulator (PWPM).

In another embodiment, the input image 54 and the screen counter 52 are connected to an address generator which generates the look-up table address and outputs the address to the look-up table 26.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A halftone dot pattern constructing system comprising:

a measuring device for measuring printer intensity levels of a printing device output in response to selected gray scale commands;

an interpolator for interpolating the measured printer intensity levels into a best fit smooth curve of measured intensity values versus the gray scale commands;

a mapping means for generating a set of halftone intensity values which correspond to the best fit smooth curve;

a dot area parameter calculator for calculating dot parameters of a halftone dot pattern for each intensity value of the set of halftone intensity values, where each intensity value is represented by a halftone cell defining one halftone dot of the halftone dot pattern, the dot parameters of the halftone dot pattern including parameters for determining a halftone dot area for each halftone cell representing each intensity value;

a gray value calculator for determining a value for each position within each of the halftone cells based on a location of a halftone dot edge within a halftone cell determined by the dot parameters calculated;

a look-up table memory for storing each of the values; and the printing device receiving the values from the look-up table to control intensity levels during a subsequent printing operation.

2. The halftone dot pattern constructing system as set forth in claim 1 further including:

a position scanner for scanning through a plurality of scan positions in each halftone cell along a scan angle direction.

3. The halftone dot pattern constructing system as set forth in claim 2 further including a measurement processor for calculating an edge distance, based on the dot parameters, from each scan position to a nearest edge of the halftone dot of the corresponding halftone cell in the scan angle direction and for calculating an edge angle from the scan angle direction to the nearest edge and wherein the gray value calculator combines at least the edge distance and the edge angle to produce the gray value for each scan position.

4. A halftone dot pattern printing system comprising:

an image input device for inputting a series of intensity levels;

a screen counter for providing a series of scan positions within a halftone cell representing each intensity level;

an address generator for converting each scan position and the intensity level of the corresponding halftone cell into a look-up table address;

a look-up table is addressed by the look-up table address to retrieve a corresponding gray value, the corresponding gray value being determined by a positional relation between the scan position of the look-up table address and a halftone dot edge defined within a halftone cell representing the intensity value of the look-up table address; and, a controller for controlling a printer in accordance with each retrieved gray value to cause a corresponding spot to be printed.

5. The halftone dot pattern printing system in accordance with claim 4 further including:

a memory for storing a family of halftone cells, each halftone cell having a characteristic intensity level;

an interpolator for interpolating measured printer intensity levels into a best fit curve;

a mapping means for mapping the family of halftone cells to a corresponding printer intensity level based on the best fit curve;

a position scanner for indexing a scan position through each of the halftone cells;

a measurement processor for determining a dot pattern intensity characteristic for each indexed scan position based on a location of each indexed scan position relative to a halftone dot edge defined within each of the halftone cells;

a gray value calculator for calculating a gray value in accordance with the dot pattern intensity characteristic for each scan position of each of the family of halftone cells, the gray values being initially loaded into the look-up table each at an address corresponding to the scan position and the intensity level of the halftone cell.

6. The halftone dot pattern printing system as set forth in claim 5 wherein the mapping means is connected with the interpolator for determining a linear tone reproduction relationship between the printer intensity levels and the intensity levels of the family of halftone cells.

7. A method for constructing a halftone dot pattern for a printing device, the halftone dot pattern including a family of halftone cells defining a corresponding family of intensity levels over a halftone intensity range, the printing device producing a plurality of printer intensity levels, the method comprising:

measuring the plurality of printer intensity levels of the printing device;

interpolating the printer intensity levels into a best fit smooth curve;

generating a set of halftone intensity values which correspond linearly to the printer intensity levels based on the best fit smooth curve;

calculating halftone dot shape parameters of a predetermined halftone dot pattern for each intensity value of the set of halftone intensity values, where each intensity value is represented by a halftone cell defining one halftone dot of the predetermined halftone dot pattern;

determining a gray value for each position in each of the halftone cells based on the halftone dot shape parameters calculated;

storing each of the gray values in a look-up table; and outputting the gray value from the look-up table to the printing device.

8. The method as set forth in claim 7 wherein the determining includes:

traversing through a plurality of scan positions of a first halftone cell of the halftone dot pattern in a scan angle direction, the first halftone cell representing a first halftone intensity value within the set of halftone intensity values; and, determining the gray value at each scan position.

9. The method as set forth in claim 8 wherein the determining further includes:

calculating an edge distance from each scan position to a nearest edge of the halftone dot defined by the halftone cell for a corresponding intensity value in the scan angle direction;

calculating an edge angle from the scan angle direction to the nearest edge;

combining at least the edge distance and the edge angle to produce the gray value for the scan position; and, the storing including storing the gray value in the look-up table at an address location, which address location is a combination of a coordinate of the corresponding scan position and the corresponding intensity level of the halftone cell.

10. The method as set forth in claim 7 further including:

generating a tone reproduction curve from the plurality of printer intensity levels of the printing device, the tone reproduction curve representing a linear mapping of area to the plurality of printer intensity levels; and, mapping the printer intensity levels based on the tone reproduction curve to the set of halftone intensity values.

11. A method of halftone dot pattern printing comprising:

storing a family of halftone dot patterns;

printing a selected portion of the family of halftone dot patterns with a selected printing device;

determining an intensity level for each printed dot pattern of the family;

dividing each dot pattern into a preselected array of scan positions;

for each scan position of each dot pattern, determining a corresponding value;

loading each gray value into a look-up table;

in subsequent printing operations, the look-up table is addressed by (i) a corresponding scan position and (ii) the intensity level of the corresponding dot pattern.

12. The method as set forth in claim 11 further including:

receiving a series of intensity levels which describe a picture to be printed;

addressing the look-up table with the received intensity levels and the preselected array of scan positions for each intensity level to retrieve corresponding gray values;

controlling the selected printing device to print the corresponding gray values.

13. The method as set forth in claim 11 further including:

determining a linear relationship between the intensity levels of the printed dot patterns and a density of the corresponding stored dot pattern;

adjusting the gray values in accordance with the linear relationship.

14. The method as set forth in claim 11 wherein the step of determining a corresponding gray value for each scan position includes determining a distance between each scan position and a nearest edge point on a dot of the dot pattern of the corresponding intensity.

15. The method as set forth in claim 14 wherein the step of determining the corresponding gray value further includes determining an angle between a normal to the nearest edge point and a direction of scanning through the scan positions.

* * * * *